Figure 4:
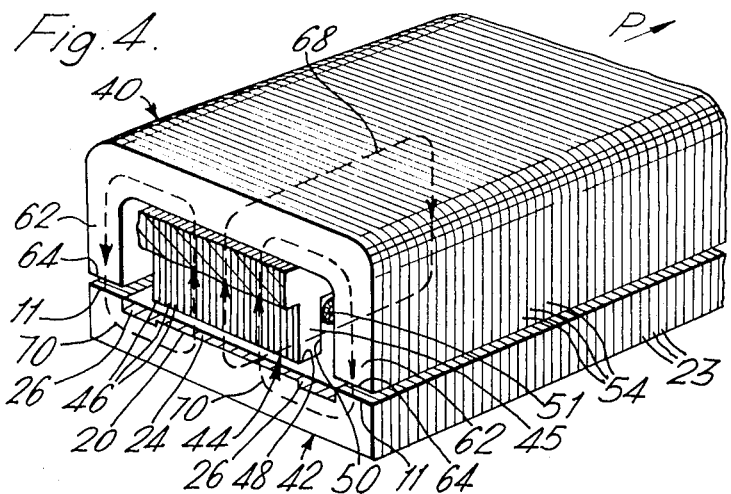

United States Patent [19]
Eastham et al.

[11] 3,770,995
[45] Nov. 6, 1973

[54] LINEAR INDUCTION MOTOR

[75] Inventors: John Frederick Eastham, Long Ditton; Hugh Robert Bolton, London, both of England

[73] Assignee: Tracked Hovercraft Limited, London, England

[22] Filed: Apr. 4, 1972

[21] Appl. No.: 241,069

[30] Foreign Application Priority Data
Sept. 18, 1969 Great Britain.................46074/69

Related U.S. Application Data
[63] Continuation of Ser. No. 73,107, Sept. 17, 1970, abandoned.

[52] U.S. Cl............................. 310/13, 104/148 LM
[51] Int. Cl. ..................................... H02k 91/09
[58] Field of Search ................ 310/12-14; 318/135; 104/148, 148 LM

[56] References Cited
UNITED STATES PATENTS

| 3,135,879 | 6/1964 | Baumann............................. 310/13 |
| 3,370,191 | 2/1968 | Koch................................. 310/13 X |
| 2,993,130 | 7/1961 | Laithwaite........................... 310/13 |
| 3,356,041 | 12/1967 | Bliss.................................. 104/148 |

Primary Examiner—D. F. Duggan
Attorney—Cameron, Kerkam & Sutton

[57] ABSTRACT

A linear induction motor has propulsive force produced in the electrically conductive reaction member forming part or all of its secondary member by flux which passes in the primary-secondary magnetic structure in both transversely orientated and longitudinally orientated magnetic laminations.

15 Claims, 11 Drawing Figures

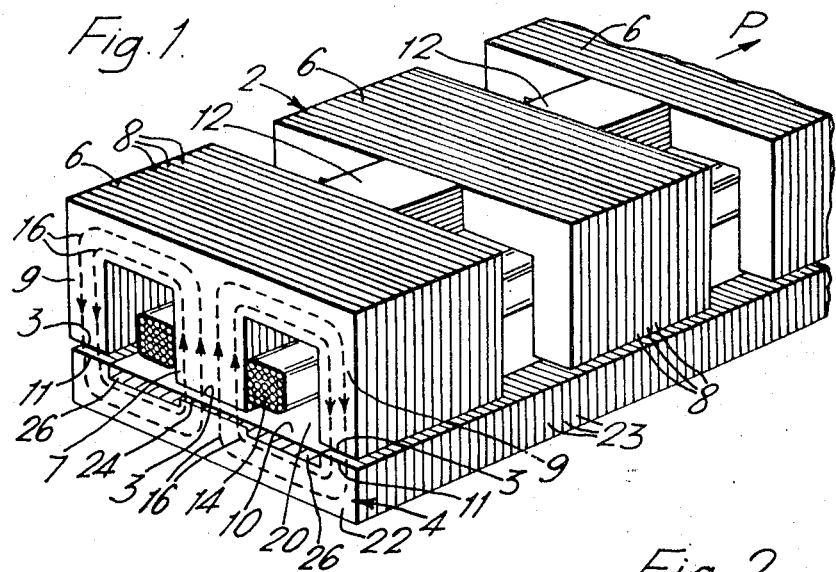
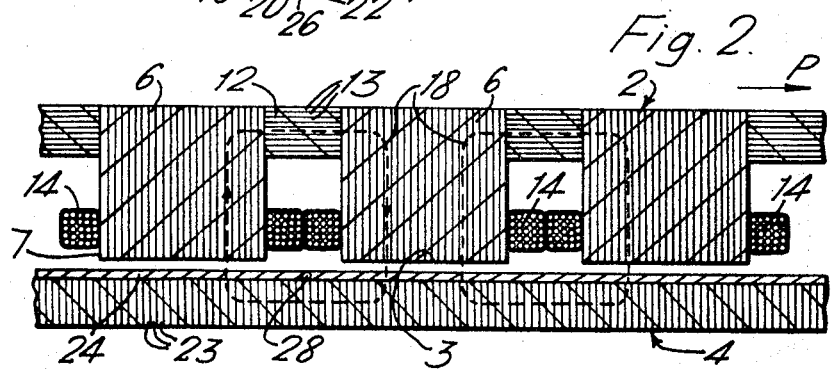
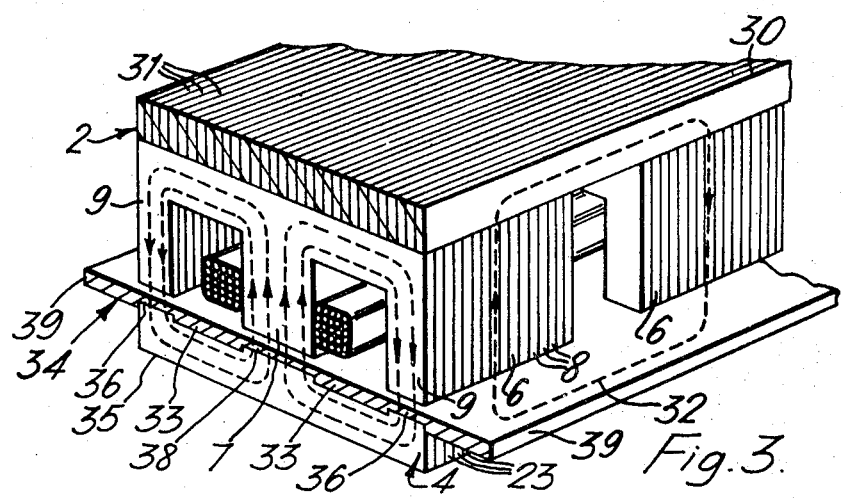

PATENTED NOV 6 1973 3,770,995

SHEET 2 OF 4

PATENTED NOV 6 1973 3,770,995

SHEET 3 OF 4 ature. The amount of magnetic material needed for the primary and, if appropriate, secondary members is then substantially independent of the pole pitch of the energising winding so that long pole pitches can be used.

LINEAR INDUCTION MOTOR

This is a Continuation, of application Ser. No. 73,107, filed Sept. 17, 1970, now abandoned.

The transverse flux paths are preferably of a substantially lower a.c. reluctance than the longitudinal paths, so that the majority of the propulsive force is produced by the transversely directed flux. The amount of magnetic material needed for the primary and, if appropriate, secondary members is then substantially independent of the pole pitch of the energising winding so that long pole pitches can be used.

The invention has particular application to high speed transportation systems such as systems in which air cushion vehicles operate at high speeds along prepared tracks.

This invention relates to linear induction motors, that is to say, to electric induction motors having a primary and secondary member arranged transversely of one another for relative longitudinal movement. The primary member comprises magnetic material formed with an energising winding, and the secondary member comprises an electrically conductive reaction member which may or may not be backed by a magnetic backing material according to whether the motor is of the single-sided kind or of the double-sided kind.

According to the present invention a linear induction motor comprises a primary member and a secondary member arranged transversely of one another for relative longitudinal movement therebetween, said primary member comprising magnetic material, and winding means formed on said magnetic material and arranged, when energised from an alternating current supply, for creating a field of magnetomotive force which travels longitudinally of the motor, said secondary member comprising electrically conductive material, said primary and secondary members being arranged and disposed transversely of the motor to provide in combination a first plurality of flux paths which are orientated transversely of the motor and which pass through said electrically conductive material, and a second plurality of flux paths which are oriented longitudinally of the motor and which also pass through said electrically conductive material, in operation flux driven around the flux paths of both pluralities by the winding means inducing in the electrically conductive material currents which react with that flux to produce a longitudinally directed force between the primary and secondary members.

Preferably the reluctances of the transversely orientated paths and of the longitudinally orientated paths are such that the longitudinally orientated paths provide only a small proportion (e.g., of the order of 10 percent) of the propulsive force. The motor then relies to a great extent on transversely directed flux for the production of propulsive force. This in turn means that the amount of magnetic material which must be provided for the primary and, if appropriate, secondary members is substantially independent of the pole pitch of the travelling field of magnetomotive force set up by the energising winding. The motor is thus particularly suited to applications in which large pole pitches are required to give high synchronous speeds at low (e.g., 50 Hz) frequencies.

The longitudinal orientated laminations and hence the longitudinal flux paths) may be provided for various reasons which differ according to the kind of linear induction motor involved. The energising winding may be formed on longitudinally spaced stacks of transverse laminations, in which case the longitudinal laminations encourage the secondary member currents to pass transversely of the motor in the positions at which they are effective to produce propulsive force. Alternatively the longitudinal laminations may themselves carry the energising winding, in which case they allow semiclosed slots for the winding to be readily provided, enabling conventional winding techniques to be used, and allow the motor width and height to be reduced.

In the above paragraph as in the remainder of specification and claims the word "reluctance" is used in its complex, i.e., A.C. sense. In the context of the present invention it is used in relation to flux paths which are provided by the primary-secondary magnetic structure, and will be understood to be dependent upon the frequency of the flux reversals in the flux path to which it refers because of the eddy currents associated with the flux path.

Figure 5:
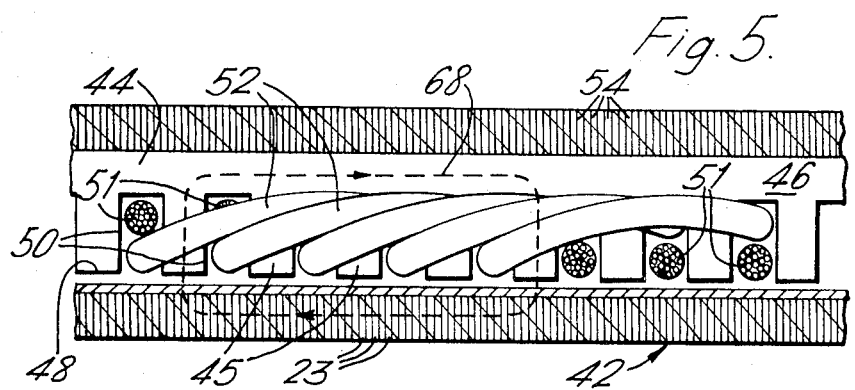
Figure 10:
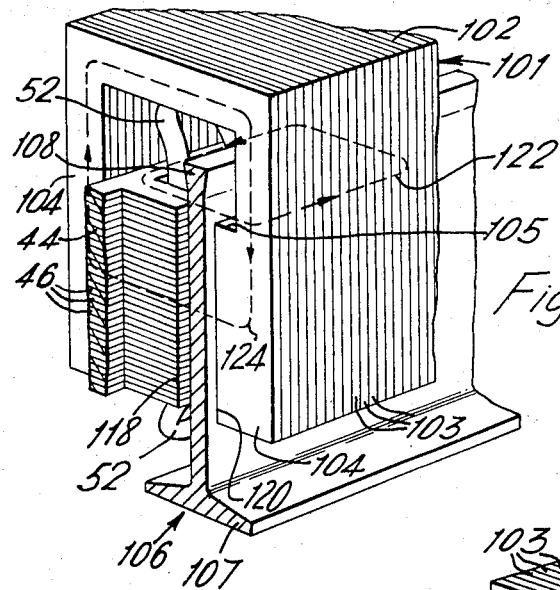
Figure 11:
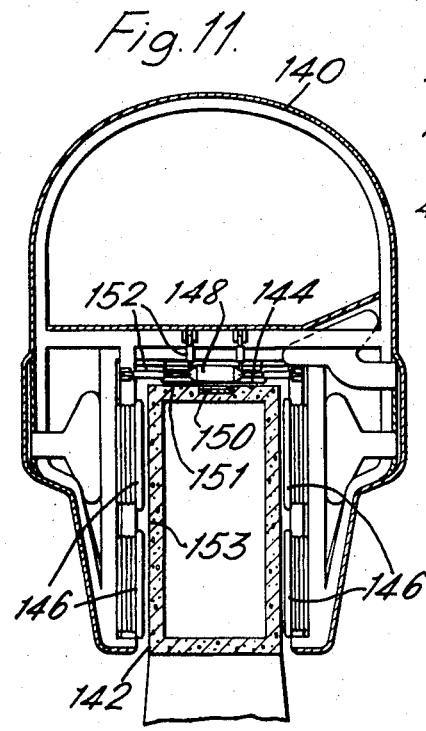

In order that the invention may be more fully understood, a number of embodiments of the invention will now be described by way of example, with reference to the accompanying diagrammatic drawings in which:

FIG. 1 is a perspective view showing a typical part of the first embodiment,

FIG. 2 is a central vertical section along a typical part of the motor of FIG. 1, FIG. 3 is a perspective view showing a typical part of the second embodiment, FIG. 4 is a perspective view showing a typical part of the third embodiment, FIG. 5 is a central vertical section along a typical part of the motor of FIG. 4, FIGS. 6, 7, 8, 9 and 10 are perspective views showing a typical part of, respectively, the fourth, fifth, sixth, seventh and eighth embodiments, and FIG. 11 shows transverse section through an air cushion vehicle propelled along a track by a linear induction motor according to the invention.

The linear induction motor shown in FIGS. 1 and 2 has a primary member 2 and secondary member 4 arranged transversely of one another for relative longitudinal movement in the direction of the arrow P. For convenience the primary member is described and shown as being vertically above the secondary member, but it will be appreciated that in this, as in the other embodiments of the invention, any orientation may be used.

The primary member 2 has a number of discrete stacks 6 of mutually insulated laminations 8 of magnetic material each orientated transversely of the motor. The lamination stacks 6 are twelve in number (only three being shown for clarity) and are spaced regularly apart longitudinally of the motor.

The laminations 8 are E-shaped so that each of the stacks has three parallel limbs of equal length. The outer ones of these limbs are indicated by the reference numeral 9 and the centre ones by the reference numeral 7. The centre limbs are approximately twice as wide as the outer limbs. The stacks 6 are each disposed so that the limbs 7, 9 extend downwardly to their end faces 3.

Extending between each pair of successive stacks 6 at the root of the centre limbs 7 are stacks 12 of longitudinally orientated and mutually insulated laminations 13 of magnetic material. Although the longitudinal laminations 13 are shown in FIGS. 1 and 2 to be horizontal, they could be vertical or inclined if desired.

The secondary member 4 is an elongate member of uniform cross section which comprises a plate-like reaction member 20, of aluminium or other electrically conductive and preferably non-magnetic material, backed by magnetic backing material 22 formed of transversely orientated and mutually insulated magnetic laminations 23.

The reaction member 20 is a shallow inverted channel having its thin, web portion 24 opposite the centre limbs 7 of the stacks 6. From the portion 24 the reaction member extends trasversely of the motor to stop just short of the outer limbs 9 of the stacks at its thicker side portions 26.

The laminations 23 extend beneath the reaction member and project beyond it at either side as to oppose the end faces 3 of the outer limbs 9 of the stacks 6 at horizontal top faces 11. The faces 11 and the top surface of the reaction member 20 form a plane upper surface 10 for the secondary member 4.

Encircling the centre limbs 7 of the stacks 6 in a common horizontal plane are simple multiturn coils 14, one to each centre limb. These twelve coils 14 are connectable by winding connections (not shown) to the three phases of a three-phase a.c. supply. Denoting the three phases by the colours Red (R), yellow (Y) and Blue (B), successive coils 14 along the primary member are connected to the phases in the order R, $\bar{Y}$, B, $\bar{R}$, Y, $\bar{B}$, R, $\bar{Y}$, B, $\bar{R}$, Y, & $\bar{B}$ where the bar over a letter denotes a reversed connection.

With the coils energised in this manner the three-phase winding which they form generates, in known manner, a field of magnetomotive force which travels longitudinally of the motor at a speed determined by the spacing of the stacks 6 and the frequency of the a.c. supply. The twelve coils 14 are such as to provide four magnetic poles of this travelling field, but the number of stacks 6 and hence coils 14 can, of course, be varied to reduce or increase the number of magnetic poles.

The laminations 8 of the stacks 6 together with the underlying secondary member laminations 23 provide low reluctance paths which are orientated transversely of the motor. Two such paths are provided side by side across the width of the motor and, as is indicated in FIG. 1 by the broken lines 16, each coil 14 drives flux in opposite senses around the pairs of side-by-side low reluctance paths associated with its respective stack.

Flux passing in each low reluctance path in this way crosses the air gap between the primary and secondary members twice, once beneath the centre limb 7 and once beneath the respective outer limb 9.

In crossing the air gap beneath the centre limbs 7 the flux created by the coils 14 passes through the web portion 24 of the reaction member and in so doing induces in the reaction member currents which flow in the plane of the reaction member in generally rectangular paths corresponding to the magnetic poles set up by the primary member. In known manner these currents react with the flux crossing the air gap beneath the centre limbs 7 to produce a longitudinally directed force between the primary and secondary members, as indicated in FIG. 1 by the arrow P. The thickened, side portions 26 of the reaction member provide low resistance paths for the longitudinally directed parts of the current paths, and by so doing ensure that beneath the cenre limbs 7 the currents are directed substantially transversely of the motor and so are effective to produce propulsive force. An additional reason for the provision of the side portions 26 is that they enable the longitudinally directed parts of the current paths to be substantially free of the flux crossing the air gap beneath the centre limbs 7, so that little or no force tending to move the primary and secondary members laterally of one another is created.

In addition to the transversely orientated low reluctance paths described above the primary-secondary magnetic circuit also provides flux paths which are directed longitudinally of the motor. Referring in particular to FIG. 2 it will be seen that the stacks 12 of longitudinally orientated laminations provide part of longitudinal flux paths which are further provided by the laminations 8 of the two stacks 6 between which the stack 12 extends, and the laminations 23 of the secondary member. Two such longitudinal flux paths are indicated in FIG. 2 by the broken lines 18.

By providing the stacks 12 and hence the associated longitudinal flux paths, transverse currents flowing in the reaction member between the centre limbs 7 in the manner indicated in FIG. 2 by the reference numeral 28 are caused to see a high inductive impedance. The transverse parts of the secondary member current paths are therefore encouraged to pass in the reaction member beneath the centre limbs 7 where they are effective to produce propulsive force. In this way the propulsive force produced by the motor is to some extent increased.

It will be appreciated that the longitudinally directed flux paths provided as described above will have a substantially higher reluctance than the transversely orientated paths previously described. This is because they are transverse to the laminations 23 of the secondary member and also to the laminations 8 of the primary member. It is envisaged that the combined reluctance of the longitudinally orientated paths provided in part by a stack 12 will be of the order of ten times the reluctance of each of the two side-by-side paths (comprising a multiplicity of paths in parallel) provided in part by each stack 6.

In addition to encouraging the transverse parts of the secondary member current paths to pass beneath the centre limbs 7 as described above, the longitudinally orientated flux paths will have a further effect in increasing the propulsive force above that produced by the transverse flux alone. This is by virtue of flux which is driven around the longitudinal flux paths by the three-phase winding and which will augment the transverse flux where it crosses the air gap between the centre limbs 7 and the secondary member, thereby producing additional propulsive force. However, because the longitudinal paths have a relatively high reluctance, the contribution of the longitudinal flux to the total propulsive force will be small, e.g., of the order of 10 percent.

The second embodiment of the invention, shown in FIG. 3, is the same as the first embodiment in many respects and like reference numerals are used to indicate like parts. The second embodiment differs from the first embodiment in that the separate stacks 12 of longitudinal laminations 13 are replaced by a single stack 30 of longitudinally orientated and mutually insulated vertical laminations 31 which extends continuously along the primary member at the top of the lamination stacks 6. The width of the lamination stack 30 is the same as that of the stacks 6. If desired the laminations 31 may be disposed in three discrete stacks one for each limb 7 and 9 and corresponding laterally thereto.

The secondary member 4 of this second embodiment differs from that of the first embodiment in that the reaction member 34, instead of stopping short of the outer limbs 9, extends across the magnetic laminations 23 of the secondary member to project beyond the side edges of the secondary member magnetic material 35 at overhanging portions 39.

Beneath the outer limbs 9 the reaction member is denoted by the reference numeral 36 and has the same thickness as the portion 38 corresponding to the web portion 24 of the first embodiment. Likewise, the overhanging portions 39 have the same, greater, thickness as the portions 33 corresponding to the side portions 26 of the first embodiment.

The second embodiment operates in substantially the same manner as the first embodiment except that secondary member current paths providing propulsive force are associated with the outer limbs 9 as well as with the centre limbs 7. In an analogous manner to the first embodiment, the laminations 31 serve to provide, in part, longitudinally directed flux paths which constrain the transverse parts of the secondary member currents to pass beneath the limbs 7 and 9 and which also provide propulsive force; one such flux path between two successive outer limbs 9 is indicated in FIG. 3 by the broken line 32. The overhanging portions 39 and the portions 33 serve the same function as the side portions 26 of the first embodiment.

In a non-illustrative modification of the first embodiment the secondary member is as shown and described for the second embodiment and the laminations 13 are of the same width as the stacks 6. Likewise in a non-illustrated modification of the second embodiment the secondary member is as shown and described for the first embodiment and the laminations 31 extend only across the width of the centre limbs 7.

In further non-illustrated modifications of the first and second embodiments and the above modifications thereof, each limb 7 and 9 carries a coil 14, for each stack 6 the outer coils 14 being energised from the same phase as the centre coil so as to aid the centre coil to drive flux around the side-by-side transversely orientated low reluctance paths provided.

In a non-illustrated embodiment of the invention the primary member magnetic material comprises discrete stacks of transversely orientated laminations. The lamination stacks are spaced apart longitudinally of the motor, and transversely of the motor are generally U-shaped, having two limbs which extend toward the secondary member. The polyphase winding means is formed on the limbs of the lamination stacks along at least one side of the motor.

The primary member magnetic material further includes longitudinal laminations which may be arranged in discrete stacks each of which extends between the opposed faces of successive ones of the stacks of transverse laminations (as in FIGS. 1 and 2) or they may be arranged in one or more stacks each of which extends continuously along the primary member adjacent the parts of the stacks of transverse laminations remote from the secondary member (as in FIG. 3).

The secondary member comprises an aluminum reaction member backed by magnetic material formed of transversely orientated laminations. The reaction member may oppose the limbs of each stack of transverse laminations along only one side of the primary member or it may oppose both limbs of each stack. Preferably the reaction member has thickened portions (e.g., 26,33,39) along the sides of the or each part thereof which is opposed to the limbs of the primary member stacks of transverse laminations.

In the arrangements so far described the polyphase winding is carried by transversely orientated laminations; in the further embodiments of the invention still to be described with reference to the drawings, the polyphase winding is carried by longitudinally orientated laminations.

In the third embodiment of the invention, shown in FIGS. 4 and 5, the primary member 40 comprises a stack 44 of mutually insulated and longitudinally orientated vertical magnetic laminations 46. The stack 44 extends continuously along the primary member.

Transverse winding slots 50 are regularly formed in the stack 44 at its under surface, and in these slots are received the winding conductors of a two-layer three-phase distributed winding of the kind which is well known in the linear induction motor art. In FIGS. 4 and 5 the winding conductors of this winding, i.e., the parts of the winding received in the winding slots 50, are indicated by the reference numeral 51 and the winding ends by the reference numeral 52.

Transversely orientated laminations 54 each generally in the form of an inverted U back the laminations 46 with their arms 62 extending downwardly outside the winding ends 52 to end faces 64. The end faces 64 and the end faces 48 of the magnetic teeth 45 between the winding slots 50 are generally coplanar.

The secondary member 42 for co-operation with the primary member 40 is essentially the same as the secondary member 4 of the first embodiment, and like reference numerals are used to indicate like parts. In this third embodiment the free top faces 11 of the laminations 23 oppose the end faces 64 of the laminations 54 and the web portion 24 of the reaction member 20 opposes the end faces 48 of the magnetic teeth 45.

For operation the winding is energised from a three-phase a.c. supply and in known manner generates a field of magnetomotive force which travels longitudinally of the motor. The transverse laminations 54 and 23 and the longitudinal laminations 46 provide in combination low reluctance paths which are orientated transversely of the motor and of which two are provided side-by-side across the width of the motor. In the manner previously described the travelling field of magnetomotive force drives flux around these paths (as is illustrated in FIG. 4 by the broken lines 70) and creates propulsive force by interaction with currents which it induces in the reaction member 20.

In addition to providing part of the low reluctance paths as described above, the laminations 46 in combination with the laminations 23 of the secondary member provide further paths for magnetic flux which are orientated longitudinally of the motor. Flux is driven around these longitudinally orientated paths by the three-phase winding as illustrated in FIGS. 4 and 5 by the broken lines 68, and this flux augments the transversely directed flux where it crosses the air gap between the stack 44 and the secondary member and so increases the propulsive force above that provided by the transverse flux. However, because the longitudinally directed flux paths are transverse of the laminations 23 and, in addition, the parts of the laminations 46 above the winding slots 50 are of such a depth that they saturate at a low level of flux, the reluctance of the longitudinal paths will be substantially higher than that of the transverse paths previously described and the contribution of the longitudinal flux to the total propulsive force will be correspondingly small (e.g., of the order of 10 percent). The main reasons for the provision of the longitudinally directed laminations 46 to carry the three-phase winding are to enable the winding slots 50 readily to be partly closed if desired by suitably widening the bases of the magnetic teeth 45 in the longitudinal direction, to allow conventional winding techniques to be used to form the three-phase winding before the transverse laminations 54 are added, and to allow the width and height of the motor to be reduced because the reduction in the flux required to be carried by the laminations 54 enables their width in the transverse direction to be correspondingly reduced.

Figure 6:
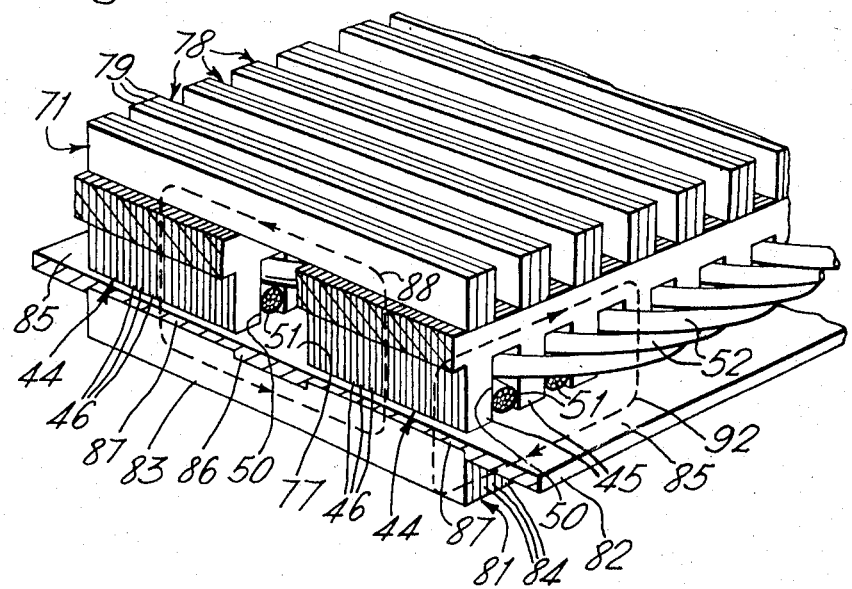

FIG. 6 shows the fourth embodiment of the invention to have a primary member 71 comprising two lamination stacks each of which is identical to the lamination stack 44 of the third embodiment, both in respect of its magnetic structure and also in respect of the three-phase winding with which it is formed; the same reference numerals as the third embodiment are therefore used for these two stacks and their associated windings.

The two stacks 44 are arranged side-by-side with a longitudinal gap 77 between them and with their winding slots 50 aligned. Discrete stacks 78 of mutually insulated transverse laminations 79 are disposed on top of the stacks 44 and are of a length to correspond laterally to the total width of those stacks. Longitudinally of the motor the stacks 78 correspond to the underlying magnetic teeth 45 of the stacks 44.

The secondary member 81 for co-operation with this primary member is of uniform cross-section and comprises an aluminium reaction member 82 backed by a magnetic backing member 83. The member 83 is formed of generally U-shaped, transversely orientated and mutually insulated magnetic laminations 84 and has its upwardly extending arms corresponding laterally to the stacks 44.

The reaction member 82 has a plane upper surface and extends across the width of the backing member 83 to project beyond it on either side at overhanging portions 85. These overhanging portions 85 and the portion 86 beneath the slot 77 are of the same equal thickness which is greater than the thickness of the portions 87 beneath the stacks 44.

In operation the two three-phase windings are energised to produce travelling fields of magnetomotive force which are in antiphase to one another transversely of the motor. The two windings therefore additively combine to drive flux around transversely orientated low reluctance paths which are provided as indicated in FIG. 6 by the broken line 88. It will be seen that each such path comprises laminations from the stacks 78 and 83 and from the stacks 44. It will also be seen that, whereas in the third embodiment (FIGS. 4 and 5) two transversely orientated low reluctance paths are provided side-by-side across the width of the motor, in the embodiment of FIG. 6 only one transversely orientated low reluctance path is provided across the width of the motor.

In the manner previously described, the transversely orientated flux creates propulsive force by interaction with current which it induces in the reaction member 82. It will be appreciated that propulsive force will be generated beneath both stacks 44 and that the portions 85 and 86 of the reaction member serve the same function as the reaction member portions 26, 33 and 39 previously mentioned.

Additional propulsive force is also produced by interaction of reaction member currents with flux which passes in longitduinally orientated paths provided by each stack 44 in combination with the underlying secondary member laminations 84. One such flux path is indicated in FIG. 6 by the broken line 92. As in the third embodiment the contribution of the longitudinal flux to the total propulsive force will be small, e.g., of the order of 10 percent.

Figure 7:
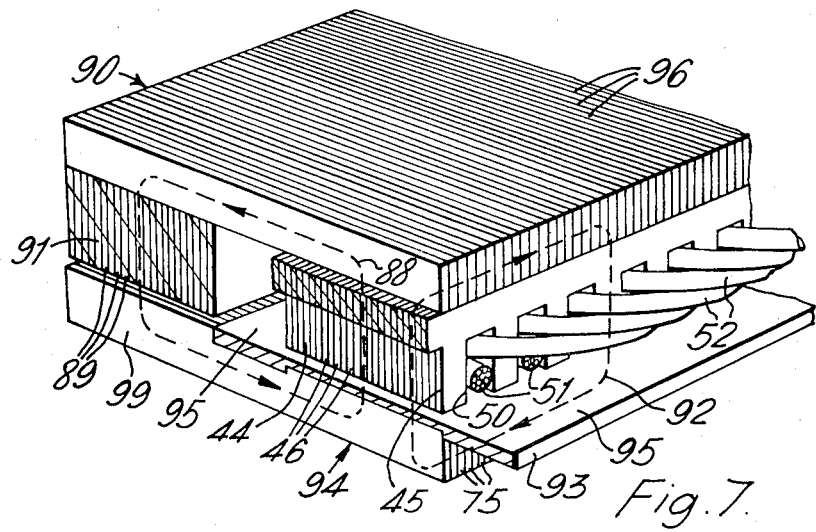

FIG. 7 shows a fifth embodiment of the invention to be a modification of the embodiment of FIG. 6 with only one of the stacks 44 of the primary member 90 slotted and formed with a winding. The other, unslotted, stack is designated by the reference numeral 91 and is formed of rectangular, longitudinally orientated and mutually insulated magnetic lamenations 89. The transverse laminations 96 of the primary member are shown to extend continuously along the primary member, but it will be appreciated that, as in FIG. 6, discrete lamination stacks disposed above the magnetic teeth 45 can be used if desired.

The reaction member 93 of the secondary member 94 is associated only with the wound stack 44, stopping just short of the unwound stack 91 at the inner one of its thickened portions 95. In addition the backing member 99, formed of transversely orientated and mutually insulated magnetic laminations 75, has its free upper face corresponding laterally to the lamination stack 91 and coplanar with the upper plane face of the reaction member 93.

In a modification of this fifth embodiment the secondary member 81 of FIG. 6 is used.

Figure 8:
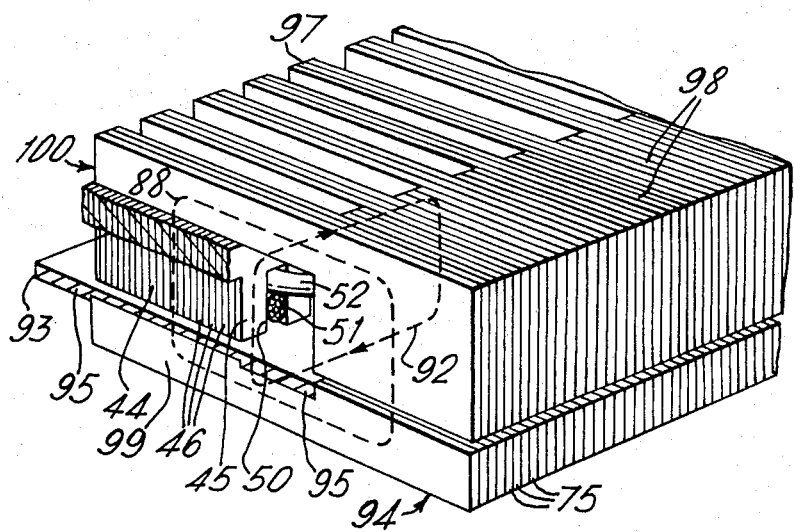

The sixth embodiment of the invention, shown in FIG. 8, is a further modification of the embodiment of FIG. 6 with one of the stacks 44 of the primary member 100 replaced by transversely orientated and mutually insulated magnetic laminations 98 which, like the stack 91 in FIG. 7, carry no winding. As shown in FIG. 8, the laminations 98 which are aligned with the magnetic teeth 45 of the wound stack 44 extend above the stack 44 to terminate vertically above its outer face in lamination stacks 97; the laminations 98 aligned with the winding slots 50, however, are rectangular and essentially act as spacers. In a modification the latter laminations are replaced by non-magnetic spacers.

The secondary member of this sixth embodiment is identical to the secondary member 94 of the fifth embodiment and like reference numerals are therefore used to indicate like parts.

The invention has so far been described in relation to single-sided linear induction motors but may also be applied to linaer induction motors of the double-sided kind, that is to say, linear induction motors in which the primary member is in two interconnected parts which in operation are disposed on either side of the co-operating secondary member. The secondary member itself is comprised of a plate-like member of electrically conductive and preferably non-magnetic material such as aluminium.

Figure 9:
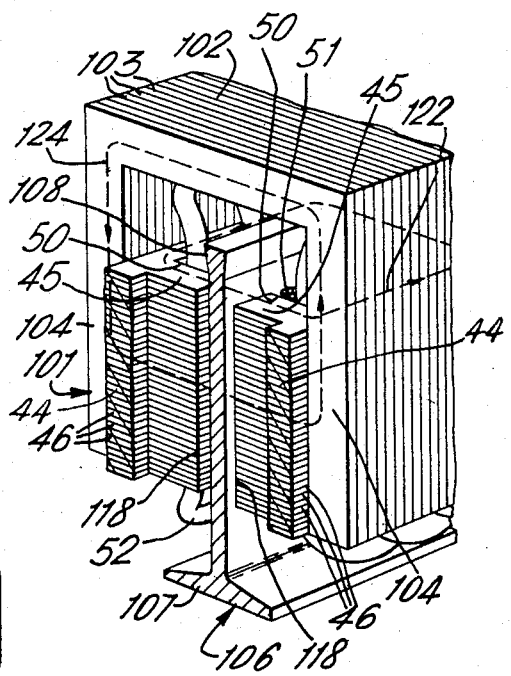

Referring now to FIG. 9, the primary member 101 of the seventh embodiment of the invention has two lamination stacks which are identical to the stacks 44 of the embodiments of FIGS. 4 to 8, and the same reference numerals are therefore used to indicate like parts.

Each stack 44 is carried with its laminations 45 horizontal by a magnetic yoke member 102 formed of transversely orientated and mutually insulated magnetic laminations 103. In transverse cross-section the yoke member is generally in the form of an inverted U, having two vertical and downwardly depending arms 104 to the inside faces of which the lamination stacks 44 are respectively attached so as to oppose one another at their inner faces 118 provided by the magnetic teeth 45.

The opposed faces 118 are separated by a gap through which extends, in spaced relation, the secondary member 106 of the linear induction motor. This secondary member 106 is provided by a vertical plate-like member of aluminium which is mounted at its base at an integral foot portion 107 and which extends vertically between and beyond the stacks 44 to terminate at an enlarged portion 108. Between the stacks 44 the member 106 is of constant thickness.

For operation, the windings of the two stacks 44 are energised from a three-phase a.c. supply so as to create travelling fields of magnetomotive force which are in antiphase transversely of the motor, and these two travelling fields combine additively to drive flux around transversely orientated low reluctance paths which are provided as illustrative in FIG. 9 by the broken line 124. It will be seen that these low reluctance paths are provided in part by the laminations 46 of the stacks 44 and in part by the laminations 103 of the yoke member 102.

In crossing the gap between the stacks 44 the flux in these transverse low reluctance paths passes through the member 106 and induces in the member currents which flow in the plane of the member in generally rectangular paths corresponding to the magnetic poles of the travelling fields of magnetomotive force. The interaction of the flux crossing the air gap and the transverse (i.e., vertical) component of these secondary member currents produces a desired longitudinal force between the primary and secondary members.

Those parts of the member 106 which project beyond the laminations 46 in the vertical direction serve to provide the low reluctance paths previously mentioned for the longitudinal directed parts of the secondary member currents. It is for this reason that the enlarged portion 108 is provided.

In addition to producing the transversely directed flux as described above, the travelling fields of magnetomotive force also drive flux around the primary-secondary magnetic structure in the longitudinal (horizontal) direction, as is illustrated in FIG. 9 by the broken line 122.

Flux passing in these longitudinal paths augments the flux in the transverse paths and so contributes to the propulsive force. The contribution will, however, be small (e.g., of the order of 10 percent) because the longitudinal paths are transverse to the laminations 103 and also because, as previously described in relation to the third embodiment, the depth of the laminations 46 where they bridge the winding slots 50 is such that saturation occurs at a low level of flux.

FIG. 10 shows the eighth embodiment of the invention to be a modification of the embodiment of FIG. 9 with one of the stacks 44 omitted and replaced by inward extensions of the laminations 103 at the corresponding arm 104 of the yoke member 102. These inward extensions form the yoke with a shoulder 105 which opposes the inner face 118 of the stack 44 at its own inner face 120.

The secondary member of this embodiment, which is identical to the secondary member 106 of the embodiment of FIG. 9 and is therefore given the same reference numerals, extends in spaced relation between the opposed faces 118 and 120.

The operation of the embodiment of FIG. 10 is identical to that of the embodiment of FIG. 9 except that only one three-phase winding is provided for driving flux around the transversely orientated flux paths 124 and the longitudinally orientated flux paths 122.

In each of six further, non-illustrated double-sided linear induction motors in accordance with the invention the primary member is formed of two of the primary members of a respective one of the first six embodiments aligned face-to-face and interconnected by a non-magnetic yoke member. The secondary member is a generally plate-like member similar to the member 106 of FIGS. 9 and 10 and which extends in spaced relation between the two primary member parts. The three-phase windings of the two primary member parts are energised to produce travelling fields of magnetomotive force which are in anti-phase transversely of the motor.

FIG. 11 shows a gas cushion vehicle 140 arranged for operation along a concrete track 142 of rectangular cross section. The vehicle has longitudinally spaced and flexibly mounted gas cushion devices 144 for supporting it above the track by co-operation with the horizontal top surface 151 of the track. Likewise the vehicle is guided along the track by flexibly mounted gas cushion devices 146 co-operating with the vertical side surfaces 153 of the track.

The vehicle is propelled along the track by a linear induction motor which may be any one of the first six embodiments previously described. The primary member 148 of the motor is carried by the vehicle for co-operation with the secondary member 150 which is an elongate member extending along the track and inset centrally into the top track surface 151. Servo-actuators 152 enable the primary member 148 to be maintained substantially at a pre-determined position relative to the secondary member 150 in both the vertical and lateral directions, despite substantial transverse movements of the vehicle body relative to the track.

In a non-illustrated modification of FIG. 11, the vehicle is propelled along the track by one of the embodiments shown in FIGS. 9 and 10. The plate-like reaction member 106 is centrally mounted on the top track surface 151, so as to form a vertical spine along the track. The vehicle is shaped to accommodate the reaction member and carries the primary member 101 for co-operation with the reaction member by means of servo-actuators which enable the relative disposition of the primary and secondary members to be maintained substantially constant.

It will be noted that in all the described embodiments of the invention the primary-secondary magnetic structure is such that flux which crosses the air gap between the primary and secondary members so as to pass through the electrically conductive reaction member partly flows in paths which are directed transversely of the motor and partly flows in paths which are directed longitudinally thereof. In all the embodiments of the invention the longitudinal paths have a reluctance which, although small in itself, is substantially higher than the low reluctance of the transverse paths, with the result that the contribution of the longitudinally directed flux to the propulsive force will be small. The motors described with reference to the drawings therefore rely to a great extent on transversely directed flux for the production of propulsive force, and in that respect the depth of the magnetic material required of the primary and secondary members for a given flux density will be substantially independent of the pole pitch of the polyphase winding formed on the primary member. This is because the cross-sectional area of the path through which the transverse flux passes in a longitudinally directed plane perpendicular to the general plane of the air gap between the primary and secondary members, being the product of the pole pitch and the core depth, is proportional to pole pitch. By core depth is meant the depth of the primary member magnetic teeth minus the teeth or limbs (as appropriate), or of the secondary member magnetic material if provided.

The feature that at least a substantial proportion of the propulsive force is generated by transversely orientated flux therefore means that the motors of the described embodiments are advantageous in applications where long pole pitches are necessary, since a large pole pitch will not, as would otherwise be the case, necessitate an excessive bulk (and hence cost) of magnetic material for the primary and, where appropriate, secondary members. This feature is particularly advantageous for single-sided linear induction motors since the magnetic material for the member which forms part of the track, usually the secondary member, represents a considerable proportion of the cost of the system as a whole.

The longitudinally orientated laminations, and hence the longitudinal flux paths, are provided in the described embodiments for various different reasons which have already been mentioned. In the first two embodiments the longitudinally orientated laminations are provided for constraining the laterally extending parts of the secondary member current paths to pass beneath the primary member limbs where they are effective to produce propulsive force; in the remaining embodiments of the invention two longitudinal directed laminations are provided for, amongst other reasons, enabling the winding slots to be readily made semi-closed and conventional winding techniques to be used, and for enabling the width of the motor to be reduced.

It is not essential for a motor in accordance with the invention to be so arranged that, as in the described embodiment, a large majority of the propulsive force is produced by the flux which passes in the transversely orientated paths; a motor in accordance with the invention may, in fact, be such that the propulsive forces separately produced by the longitudinal and transverse fluxes are in any finite ratio which will, of course, depend on the relative values of the reluctances of the longitudinal and transverse flux paths. Thus within the scope of the invention are linear induction motors which are essentially longitudinal flux machines, that is to say, they essentially rely on longitudinal flux for producing propulsive force, but which, fo some reason or another, ahve flux paths provided for transverse flux.

Although the primary member magnetic material of the described embodiments is laminated both longitudinally (i.e., to form transverse laminations) and transversely, in some applications of the invention either one or both of the parts of the primary member magnetic material serving to provide at least part of the transverse and longitudinal flux paths may be unlaminated.

We claim:

1. A linear induction motor comprising a primary member and a secondary member spaced apart with a single planar air gap therebetween, said primary member comprising magnetic material and winding means formed on said magnetic material and arranged, when energised from an alternating current supply, for creating a field of magnetomotive force which travels longitudinally of the motor, said secondary member comprising electrically conductive material, said primary and secondary members being arranged and disposed transversely of the motor to provide in combination a first plurality of flux paths which are orientated transversely of the motor and a second plurality of flux paths which are orientated longitudinally of the motor, in operation flux driven around the flux paths of both pluralities by the winding means inducing in the electrically conductive material currents which react with that flux to produce a longitudinally directed force between the primary and secondary members.

2. A linear induction motor comprising a primary member and a secondary member spaced apart with a single planar air gap therebetween, said primary member having magnetic material comprising a first part and a second part and winding means formed on said first part and arranged, when energised from an alternating current supply, for creating a field of magnetomotive force which travels longitudinally of the motor, said secondary member comprising electrically conductive material, said primary and secondary members being arranged and disposed transversely of the motor to provide in combination a first plurality of flux paths which are orientated transversely of the motor, and a second plurality of flux paths which are orientated longitudinally of the motor, the flux paths of one of said plurality being provided in part by the said first part of the primary member magnetic material and in part by the said second part thereof, the flux paths of the other said plurality being provided in part by only the first part of the primary member magnetic material, in operation flux driven around the flux paths of both pluralities by the winding means inducing in the electrically conductive material currents which react with that flux to produce a longitudinally directed force between the primary and secondary members.

3. A linear induction motor comprising a primary member and a secondary member spaced apart with a single planar air gap therebetween, said primary member having magnetic material comprising a first part formed of at least one stack of magnetic laminations and a second part, and winding means formed on said first part and arranged, when energised from an alternating current supply, for creating a field of magnetomotive force which travels longitudinally of the motor, said secondary member comprising electrically conductive material, said primary and secondary members being arranged and disposed transversely of the motor to provide in combination a first plurality of flux paths which are orientated transversely of the motor and which pass through said electrically conductive material, and a second plurality of flux paths which are orientated longitudinally of the motor and which also pass through said electrically conductive material, the flux paths of one said plurality being provided in part by said first part of the primary member magnetic material and in part by the said second part thereof, the flux paths of the other said plurality being provided in part by only the said first part of the primary member magnetic material, in operation flux driven around the flux paths of both pluralities by the winding means inducing in the electrically conductive material currents which react with that flux to produce a longitudinally directed force between the primary and secondary members.

4. A linear induction motor comprising a primary member and a secondary member spaced apart with a single planar air gap therebetween, said primary member having magnetic material comprising a first part formed of at least one stack of magnetic laminations each orientated longitudinally of the motor and a second part formed of magnetic laminations each orientated transversely of the motor, and winding means formed on one of said parts and arranged, when energised from an alternating current supply, for creating a field of magnetomotive force which travels longitudinally of the motor, said secondary member comprising electrically conductive material, said primary and secondary members being arranged and disposed transversely of the motor to provide in combination a first plurality of flux paths which are orientated transversely of the motor and which pass through said electrically conductive material, and a second plurality of flux paths which are orientated longitudinally of the motor and which also pass through said electrically conductive material, the flux paths of one said plurality being provided in part by the said first part of the primary member magnetic material and in part by the said second part thereof, the flux paths of the other said plurality being provided in part by only the said part of the primary member magnetic material which is formed with the winding means, in operation flux driven around the flux paths of both pluralities by the winding means inducing in the electrically conductive material currents which react with that flux to produce a longitudinally directed force between the primary and secondary members.

5. A linear induction motor according to claim 3, wherein the first part of the primary member magnetic material comprises a plurality of lamination stacks which are spaced apart longitudinally of the motor and which are formed with the winding means, each lamination stack being formed of transversely orientated laminations and having at least two transversely spaced limbs extending towards the secondary member, the second part of the primary member magnetic material being arranged magnetically to bridge the said spaces between the lamination stacks.

6. A linear induction motor according to claim 5, wherein the second part of the primary member magnetic material comprises discrete portions each disposed to extend between the opposed faces of successive ones of the lamination stacks.

7. A linear induction motor according to claim 5, wherein the second part of the primary member magnetic material extends continuously along the primary member adjacent the lamination stacks.

8. A linear induction motor according to claim 5, wherein the secondary member includes magnetic material formed of transversely orientated magnetic laminations arranged to provide further parts of the flux paths of each said plurality.

9. A linear induction motor according to claim 2, wherein the first part of the primary member magnetic material extends continuously along the primary member and has its face opposed to the secondary member formed with longitudinally spaced winding slots in which are received the winding conductors of the winding means, the first part of the primary member magnetic material providing part of the flux paths of the said second plurality and the second part of the primary member magnetic material extending transversely of the motor from the said first part to provide, in combination with the said first part, a least part of the flux paths of said first plurality.

10. A linear induction motor according to claim 9, wherein the first part of the primary member magnetic material is dimensioned to saturate at a low level of flux where it bridges the winding slots.

11. A linear induction motor according to claim 9, which includes two said first parts of the primary member magnetic material spaced transversely apart by a gap which is magnetically bridged by the said second part of the primary member magnetic material, the winding means of the two said first parts being energisable to produce travelling fields of magnetomotive force which are substantially in antiphase with one another transversely of the motor.

12. A linear induction motor according to claim 9, wherein the second part of the primary member magnetic material extends transversely of the motor from either side of the first part to provide, in combination with the first part, part of the flux paths of two said pluralities side-by-side across the width of the motor.

13. A linear induction motor according to claim 11, wherein the said first parts of the primary member magnetic material are arranged side-by-side with their said faces formed with the winding slots generally coplanar and facing in the same direction, and the secondary member comprises a generally plate-like member of electrically conductive material generally parallel to the plane of said faces, and further magnetic material adjacent the side of the said member remote from the primary member for providing part of the flux paths of the first and second pluralities.

14. A linear induction motor according to claim 11, wherein the second part of the primary member magnetic material is generally U-shaped in cross-section having two generally parallel arms, and the two said first parts of the primary member magnetic material are carried by respective ones of the arms of the insides thereof so as to oppose one another in spaced relationship at their said faces formed with the winding slots, the secondary member being constituted by said electrically conductive material which extends between the opposed faces in spaced relation thereto.

15. A linear induction motor as claimed in claim 1 in combination with a vehicle which carries the primary member and a prepared track along which the vehicle is arranged for operation and which carries the secondary member, the primary and secondary members being arranged for co-operation to propel the vehicle along the track.

* * * * *